United States Patent [19]

Lunzman

[11] Patent Number: 5,366,202
[45] Date of Patent: Nov. 22, 1994

[54] DISPLACEMENT CONTROLLED HYDRAULIC PROPORTIONAL VALVE

[75] Inventor: Stephen V. Lunzman, Chillicothe, Ill.

[73] Assignee: Caterpillar Inc., Peoria, Ill.

[21] Appl. No.: 90,375

[22] Filed: Jul. 6, 1993

[51] Int. Cl.⁵ ............................................. F16K 31/124
[52] U.S. Cl. .................... 251/30.05; 91/387; 137/625.64; 251/47
[58] Field of Search ................ 137/625.64; 91/387; 251/30.05, 47

[56] References Cited

U.S. PATENT DOCUMENTS

| | | | |
|---|---|---|---|
| 3,339,573 | 9/1967 | Bahniuk | 137/625.64 X |
| 3,757,823 | 9/1973 | Knutson | 137/625.64 |
| 3,783,901 | 1/1974 | Schneider et al. | 137/625.64 |
| 4,201,116 | 5/1980 | Martin | 91/387 |
| 4,202,171 | 5/1980 | Jurisch et al. | 91/387 X |
| 4,719,943 | 1/1988 | Perach | 137/625.65 |
| 5,144,983 | 9/1992 | Schweim | 137/625.64 |

FOREIGN PATENT DOCUMENTS 0074581 9/1982 European Pat. Off. ............. 91/387

Primary Examiner—Gerald A. Michalsky
Attorney, Agent, or Firm—John W. Grant

[57] ABSTRACT

A displacement controlled hydraulic proportional valve is provided with a dashpot disposed between a main valve spool and a pilot valve spool to stabilize the proportional valve. The dashpot includes a bore in a spring retainer engaging the main valve spool and a plunger axially extending from a spring retainer engaging the pilot valve spool with the plunger extending into the bore to define a dashpot chamber. The plunger is sized to permit restricted fluid flow thereby when the spools move relative to each other thereby dampening relative movement between the valve spools. Dampening the relative movement between the valve spools drastically reduces the amount of overshoot by the main valve spool.

4 Claims, 1 Drawing Sheet

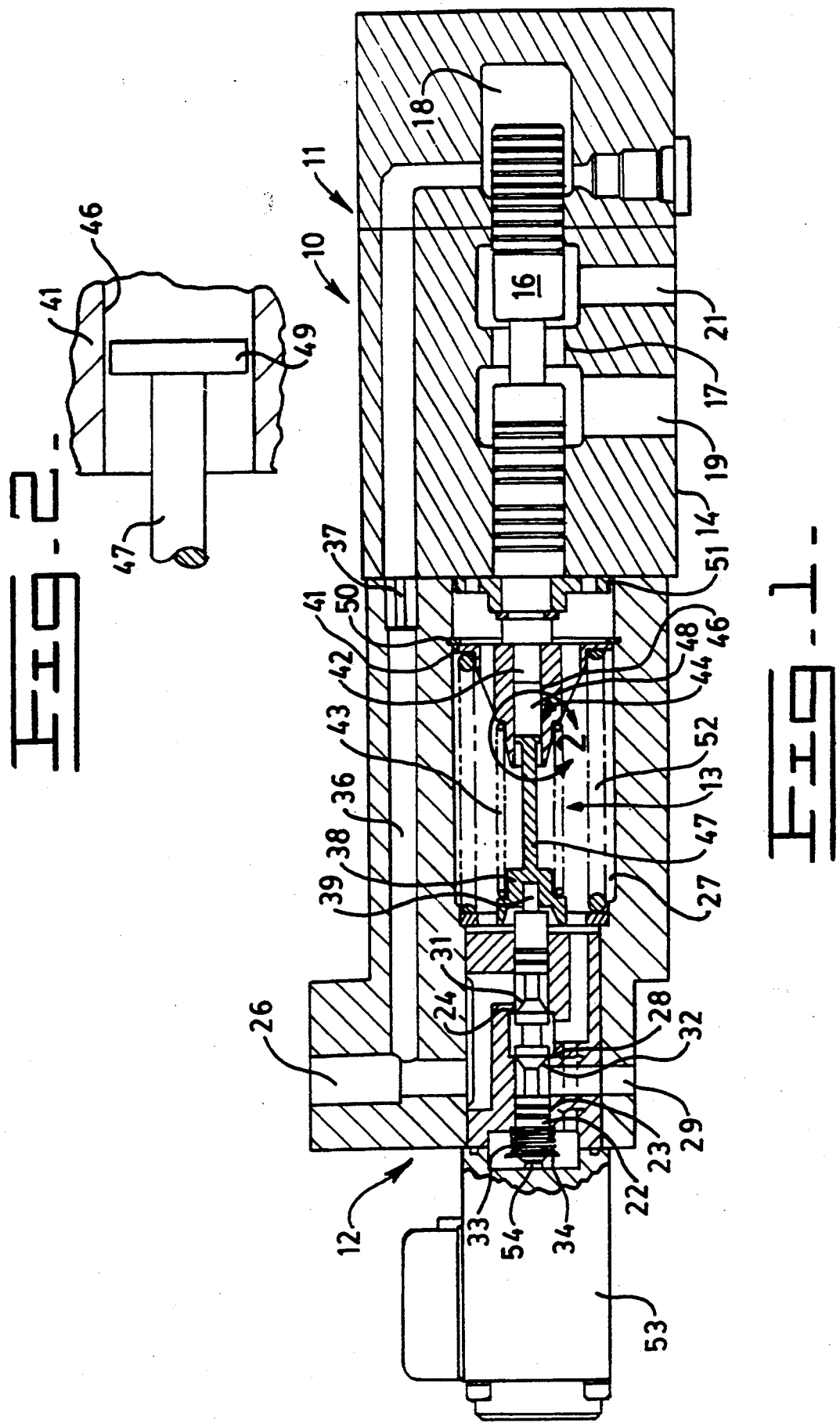

DISPLACEMENT CONTROLLED HYDRAULIC PROPORTIONAL VALVE

TECHNICAL FIELD

This invention relates to a servo type hydraulic control valve for use in hydraulic systems and more particularly to a displacement controlled hydraulic proportional valve having a force feedback spring positioned between a main valve spool and a pilot valve spool.

BACKGROUND ART

Some of the displacement controlled hydraulic proportional valves have a main control valve for controlling the main fluid flow between a supply pump and a hydraulic motor and a pilot valve for controlling the actuation of the main control valve. The pilot valve is typically controlled by a proportional solenoid exerting a control force on a pilot valve spool to move the pilot valve spool toward a main control valve spool. Moving the pilot valve spool toward the main control spool controls fluid pressure in a control chamber such that the main spool moves toward the pilot valve spool. The displacement of the main control spool is mechanically fed back to the pilot valve spool through a force feedback spring so that displacement of the main spool is proportional to the control force exerted on the pilot valve spool by the solenoid.

One of the problems encountered with such displacement controlled hydraulic proportional control valves is that the main spool has a tendency to oscillate or become unstable under some operating conditions. One of the factors contributing to the instability is the fact that displacement of the main control valve spool is dependant upon the control force and feedback force on the pilot valve spool reaching equilibrium. Thus, if the acceleration forces on the main spool are too high, the main spool tends to overshoot the desired position such that the feedback forces acting on the pilot valve causes the pilot valve spool to oscillate which, in turn, causes the main spool to oscillate. The same pilot valve is frequently used with several sizes of main control valves and the instability is more pronounced on the control valves having smaller diameter main valve spools.

The force feedback spring is normally a coil compression spring and another problem encountered is that the spring tends to buckle under compression. This imposes a side load or torque on the pilot valve spool causing increased friction between the spool and the bore. The increased friction may result in hunting movements of the pilot and main spool.

It would, thus, be advantageous to have a displacement controlled hydraulic proportional control valve design which is stable regardless of the size of the main control valve spool and reduces the potential for hunting movements.

The present invention is directed to overcoming one or more of the disadvantages or problems as set forth above.

DISCLOSURE OF THE INVENTION

In one aspect of the present invention, a displacement controlled hydraulic proportional valve has a main valve spool, a pilot valve hydraulically controlling the displacement of the main valve spool and having a pilot valve spool in axial alignment with the main valve spool, means for biasing the main valve spool toward the pilot valve spool and a force module disposed to selectively move the pilot valve spool toward the main valve spool so that the main valve spool moves toward the pilot valve spool. The proportional valve comprises a first spring retainer engaging the main valve spool, a second spring retainer engaging the pilot valve spool, a compression feedback spring positioned between the first and second spring retainers to exert a feedback force against the pilot valve spool in proportion to the displacement of the main valve spool and a dashpot disposed between the first and second spring retainers to dampen relative movement therebetween.

BRIEF DESCRIPTION OF THE DRAWINGS

FIG. 1 is a diagrammatic sectional view through an embodiment of the present invention; and FIG. 2 is a somewhat enlarged sectional view enclosed by line 2 of FIG. 1.

BEST MODE FOR CARRYING OUT THE INVENTION

A displacement controlled hydraulic proportional control valve 10 includes a main control valve 11, a pilot valve 12 and a mechanical feedback mechanism 13 housed within a multi-piece valve body 14. The main control valve 11 includes a main valve spool 16 slidably disposed in a bore 17 and defining an actuating chamber 18. The spool controls communication between a pair of ports 19,21 intersecting the bore 17.

The pilot valve 12 hydraulically controls the displacement of the valve spool 16 and includes a valve spool 22 slidably disposed in a bore 23 axially aligned with the valve spool 16. The valve spool 22 is movable in a direction away from the spool 16 to provide a variable meter-in orifice 24 between an inlet port 26 and a control chamber 27 and in a direction toward the spool 16 to provide a variable meter-out orifice 28 between the control chamber 27 and an outlet port 29. The meter-in orifice 24 is defined in part by a conical metering surface 31. The meter-out orifice 28 is defined in part by a conical metering surface 32. A stabilizing spring 33 is positioned between the body 14 and a retainer 34 suitably connected to the valve spool 22. A second stabilizing spring may be located between 22 and 38. A passage 36 communicates the inlet port 26 with the actuating chamber 18 through a dampening orifice 37.

The mechanical force feedback 13 includes a spring retainer 38 slidably disposed on an extension 39 of the pilot valve spool 22, a spring retainer 41 seated on an extension 42 of the valve spool 16, a coil compression force feedback spring 43 disposed between the spring retainers 38,41 to resiliently bias the valve spools away from each other, and a dashpot 44 disposed between the spring retainers 38,41 to dampen relative movement therebetween. The dashpot 44 includes a bore 46 in the spring retainer 41 opening toward the spring retainer 38 and a plunger 47 extending axially from the retainer 38 and into the bore 46 to define a dashpot chamber 48. The plunger has a head portion 49 sized to permit restricted flow thereby into or out of the dashpot chamber 48 when the valve spools move relative to each other. Rightward movement of the spring retainer 41 is limited by a snap ring 50. A washer 51 secured to the valve spool 16 abuts the body 14 to limit rightward movement of the valve spool 16 and engages the snap ring 50 to limit leftward movement thereof. A main spool return spring 52 is disposed between the body 14 and the spring retainer 41 to resiliently urge the valve spool 16 to the position shown.

A force module in the form of a proportional solenoid 53 is suitably connected to the body 14 and has a stem 54 in abutment with the pilot valve spool 22. The solenoid 53 is energized when an electrical signal is directed thereto from a power source, not shown, with the control force exerted on the valve spool 23 by the stem 54 being proportional to the strength of the electrical signal.

INDUSTRIAL APPLICABILITY

The main control valve 11 of this embodiment is of the type commonly referred to as an area control valve. More specifically, leftward movement of the valve spool 16 from the position shown progressively restricts and eventually blocks communication between the ports 19 and 21. Alternatively, the valve spool could be configured to normally block communication between the ports 19 and 21 wherein leftward movement progressively establishes communication between the ports 19 and 21.

The components of the control valve 10 are shown in the position they would occupy when the inlet port 26 is connected to a source of pilot fluid, the outlet port 29 is connected to a tank and a maintenance electrical signal is directed to the solenoid 53 for exerting a predetermined minimal force on the valve spool 22. Pressurized pilot fluid is transmitted through the passage 36 and the orifice 37 into the actuating chamber 18 for continuously biasing the valve spool 16 in a leftward direction toward the pilot valve spool 22. However, the pressurized fluid from the inlet port 26 also passes through the meter-in orifice 24 into the control chamber 27. The force exerted on the spool 16 by the pressurized fluid in the chamber 27 combined with the force of the spring 52 is sufficient to maintain the retainer 41 against the snap ring 50 such that the main valve spool 16 is in the position shown at which the port 19 communicates with the port 21.

To actuate the control valve 10, an electrical signal is directed to the solenoid 53 which, in turn, exerts a control force against the spool 22 proportional to the strength of the electrical signal. The control force moves the spool 22 rightwardly against the bias of the feedback spring 43 to initially block communication between the inlet port 26 and the control chamber 27 and subsequently communicates the control chamber 27 with the outlet port 29 to vent the control chamber. This reduces the pressure level in the control chamber 27 so that the force of the pressurized fluid in the actuating chamber 18 moves the valve spool 16 leftwardly in a valve closing direction to modulatably control communication between the ports 19 and 21. The leftward movement of the valve spool 16 compresses the feedback spring 43 which exerts a feedback force against the valve spool 22 to counteract the control force exerted on the valve spool 22 by the solenoid 53. The leftward movement of the valve spool 16 will continue until the feedback force and the control force acting on the valve spool 22 are in equilibrium. At this point, communication between the inlet port 26 and the control chamber 27, and between the control chamber 27 and the outlet port 29 is controllably modulated such that displacement of the valve spool 16 is proportional to the level of the control force exerted on the pilot valve 22 by the solenoid 53.

During the above operation relative movement between the pilot valve spool 22 and the main valve spool 16 toward each other causes the fluid trapped in the chamber 48 to pass between the head portion 49 and the bore 46. This dampens the relative movement of the valve spools in two ways. First of all, restricting fluid flow from the chamber 48 causes the fluid in the chamber 48 to become somewhat pressurized so that a small additional feedback force is transmitted to the valve spool 22 through the plunger 47 in combination with the feedback force exerted by the feedback spring 43. Secondly, forcing the fluid to pass between the head portion and the bore reducibly controls the acceleration forces of the valve spool 16. These combined actions in many cases totally eliminates the tendency of the valve spool 16 to overshoot the position dictated by the electrical control signal.

Additional dampening of the movement of the valve spool 16 is afforded by the orifice 37 which restricts fluid flow between the inlet port 26 and the actuating chamber 18 to reduce the acceleration forces of the valve spool The conical metering surfaces 31,32 also provide some dampening by increasing the flow forces acting on the valve spool 22 due to fluid flow through the meter-in orifice 24 and the meter-out orifice 28 respectively, particularly as the valve spool approaches its flow blocking position. Moreover, the conical metering surfaces reduces the opening area between the inlet port 16 and the control chamber 27 and between the control chamber 27 and the outlet port 29 thereby reducing the tendency of the valve spool 16 to overshoot.

The plunger 47 slidably extending into the bore 46 greatly reduces the torque or side loading exerted onto the pilot valve spool 22 due to buckling of the feedback spring 43 when it is compressed.

In view of the above, it is readily apparent that the structure of the present invention provides a displacement controlled hydraulic proportional valve having improved spool dampening. This is accomplished by providing the dashpot between the spring retainers so that relative movement between the valve spools is dampened by forcing fluid to flow between a restricted opening between the plunger and the bore. Dampening the relative movement of the valve spools greatly increases the stability of the proportional valve. Additional dampening is provided by restricting fluid flow to the actuating chamber at the end of the main valve spool. The conical metering surfaces on the pilot valve spool also provides a dampening effect on the pilot valve spool, thereby contributing to the stability of the proportional valve.

Other aspects, objects and advantages of this invention can be obtained from a study of the drawings, the disclosure and the appended claims.

I claim:

1. A displacement controlled hydraulic proportional valve having a main valve spool, a pilot valve hydraulically controlling the displacement of the main valve spool and having a pilot valve spool in axial alignment with the main valve spool, means for biasing the main valve spool toward the pilot valve spool and a force module disposed to selectively move the pilot valve spool toward the main valve spool comprising:
   an extension on the main valve spool;
   a first spring retainer seated on the extension of the main valve spool;
   an extension on the pilot valve spool;

a second spring retainer disposed on the extension of the pilot valve spool;

a compression force feedback spring positioned between the first and second spring retainers to exert a feedback force against the pilot valve spool in proportion to the displacement of the main valve spool; and a dashpot disposed between the first and second spring retainers to dampen relative movement therebetween.

2. The displacement controlled hydraulic proportional valve of claim 1, wherein the dashpot includes a bore in one of the spring retainers and opening toward the other of the spring retainers and a plunger extending from the other spring retainer and into the bore in said one spring retainer, the plunger being sized to permit restricted flow thereby when the valve spools move relative to each other.

3. The displacement controlled hydraulic proportional valve of claim 2, wherein the bore is formed in the first retainer and the plunger extends from the second spring retainer.

4. The displacement controlled hydraulic proportional valve spool of claim 1, wherein the pilot valve has a meter-in orifice defined in part by a conical metering surface and a meter-out orifice defined in part by another conical metering surface.

* * * * *